United States Patent
Luo et al.

(10) Patent No.: US 12,287,187 B2
(45) Date of Patent: Apr. 29, 2025

(54) METHOD FOR REDUCING BLASTING VIBRATION OF TUNNELING

(71) Applicant: CHINA MCC5 GROUP CORP. LTD., Sichuan (CN)

(72) Inventors: Yixin Luo, Sichuan (CN); Li Luo, Sichuan (CN)

(73) Assignee: CHINA MCC5 GROUP CORP. LTD, Sichuan (CN)

( * ) Notice: Subject to any disclaimer, the term of this patent is extended or adjusted under 35 U.S.C. 154(b) by 331 days.

(21) Appl. No.: 17/819,167

(22) Filed: Aug. 11, 2022

(65) Prior Publication Data

US 2023/0304888 A1    Sep. 28, 2023

(30) Foreign Application Priority Data

Mar. 23, 2022  (CN) .......................... 202210288061.7

(51) Int. Cl.
  *F42D 1/06*  (2006.01)
  *F42D 1/055*  (2006.01)
  *F42D 3/04*  (2006.01)

(52) U.S. Cl.
  CPC ................ *F42D 1/06* (2013.01); *F42D 1/055* (2013.01); *F42D 3/04* (2013.01)

(58) Field of Classification Search
  CPC ................ F24D 1/005; F24D 1/06; F24D 3/04
  See application file for complete search history.

(56) References Cited

PUBLICATIONS

Tunnel millisecond-delay controlled blasting based on the delay time calculation method and digital electronic detonators to reduce structure vibration effects. PLoS One 14(3), Mar. 22, 2019.*

* cited by examiner

*Primary Examiner* — Nathaniel J Kolb
(74) *Attorney, Agent, or Firm* — NKL Law; Allen Xue

(57) ABSTRACT

A method for reducing blasting vibration of tunneling includes the steps of: dividing the cutting holes into several groups according to different cutting methods; conducting layout and test blasting on one group of cutting holes; testing blasting parameters for the layout and test blasting; calculating an interval t; conducting layout and test blasting on at least two groups of cutting holes again; testing blasting parameters for the layout and test blasting of each group for the second time; taking the minimum interval t of each group as the interval for formal blasting of the remaining groups of cutting holes. The use of the characteristics of the wave in the invention can superpose the peaks and troughs of the vibration wave, and further cancel out mutually; reduce the peaks of the blasting vibration and fill the troughs of the blasting vibration.

4 Claims, 1 Drawing Sheet

Schematic Diagram of Mutual Cancellation Out of Blasting Vibration Waves

METHOD FOR REDUCING BLASTING VIBRATION OF TUNNELING

TECHNICAL FIELD

The present invention relates to the technical field of tunnel blasting, in particular to a method for reducing blasting vibration of tunneling.

BACKGROUND

With the rapid development of national infrastructure, subway and highway tunnels are often close to existing buildings in municipal construction. It is necessary to ensure the blasting effect, control the relationship between the tunnel profile and the reduction of blasting vibration, ensure the normal construction and protect the existing buildings from the damage of tunnel blasting construction.

At present, the main way to control blasting vibration is to use millisecond blasting technology, which is realized by reducing the priming charge of single section or extending the millisecond time. It is relatively mature in open-air blasting, especially after the promotion and application of single hole millisecond technology, the blasting vibration can be greatly reduced. However, under the conditions of underground environment, the blasting free face is less, and it is necessary to cut the blast holes to provide sufficient compensation space for the subsequent blast holes to accommodate the collapsed rocks, otherwise it is very easy to damage the surrounding rock mass, especially the tunneling blasting. In all the cutting methods, the cutting effect of butt cutting is the best. This cutting method has the following characteristics: 1. wedge-shaped layout; 2. large charge of blast hole; 3. multi-hole simultaneous detonation; 4. the high-temperature gas generated by explosion is used to do work to push out the broken rock block to form a trapezoid space. The blasting principles of other cutting methods are basically similar to that of the butt cutting method. Therefore, it is the key factor to increase the charge of blast hole and improve the effective work of explosive gas. However, at the same time, the blasting vibration caused by cutting blasting is large, which is not conducive to the protection of nearby buildings.

SUMMARY

The present invention is intended to solve at least one of the technical problems in the prior art.

For this purpose, the present invention provides a method for reducing blasting vibration of tunneling.

The present invention provides a method for reducing blasting vibration of tunneling, comprising the following steps:
dividing the cutting holes into several (two) groups or (three) groups according to different cutting methods;
conducting layout and test blasting on one group of cutting holes before formal tunnel blasting;
testing blasting parameters for the layout and test blasting, the blasting parameters at least including a period of a vibration wave for the layout and test blasting;
calculating an interval t, where t=T/2, T being the time from the adjacent peak to the trough of the vibration wave;
conducting layout and test blasting on at least two groups of cutting holes again;
testing blasting parameters for the layout and test blasting of each group for the second time, and the blasting parameters at least including a period of a vibration wave for the layout and test blasting;
calculating an interval t, where t=T/2, T being the period from the adjacent peak to the trough of the vibration wave in the second layout and test blasting;
taking the minimum interval t of each group as the interval for formal blasting of the remaining groups of cutting holes, and conducting formal blasting.

The method for reducing blasting vibration of tunneling according to the above technical solution of the present invention may also have the following additional technical features:

In the above technical solution, other blast holes are subject to inter-row group millisecond blasting or single hole millisecond blasting.

In the above technical solution, the interval of other blast holes is the maximum interval t of each group In the above technical solution, the blasting parameters at least include:
frequency, speed and complete oscillogram of the vibration wave.

In the above technical solution, the recommended interval is t=5 ms when the rock mass hardness is small.

In the above technical solution, the rock mass is at least shale, mudstone and sandstone In the above technical solution, the recommended interval is t=3 ms when the rock mass hardness is big.

In the above technical solution, the rock mass is at least gabbro and limestone.

Compared with the prior art, the method for reducing blasting vibration of tunneling proposed by the present invention has the following beneficial effects:
1. The use of the characteristics of the wave is used in the method for reducing blasting vibration of tunneling proposed by the present invention, to ensure that the interval t of two sections of blast holes is T/2, thereby superposing the peaks and troughs of the vibration wave, and further canceling out mutually.
2. The method for reducing blasting vibration of tunneling proposed by the present invention is equivalent to reducing the peaks of the blasting vibration and filling the troughs of the blasting vibration, so as to balance vibration and reduce the damage to the surrounding buildings.
3. For the control of blasting vibration, the method for reducing blasting vibration of tunneling proposed by the present invention promotes the reliability and operability, so as to improve the quality and efficiency of blasting.
4. The method for reducing blasting vibration of tunneling proposed by the present invention can reduce the workload of blasting process, improve the construction speed, and save labor, materials, energy consumption and costs.

The additional aspects and advantages of the present invention would become clear from the description below or would be understood through the practice of the present invention.

BRIEF DESCRIPTION OF THE DRAWINGS

The aspects and advantages mentioned above and/or attached would be clear and easy to understand through the description of embodiments combining the following drawings, wherein.

DESCRIPTION OF THE PREFERRED EMBODIMENTS

The present invention will be further described in detail in combination with accompanied drawings and embodiments for clear understanding of the purpose, features and advantages of the invention. It should be noted that the features in the embodiments and the embodiments of the present application may be combined with each other in a non-conflicting situation.

In the following description, numerous specific details are set forth in order to provide a thorough understanding of the present invention. However, the present invention may also be implemented in other ways different from those described here, so the protection scope of the present invention is not limited by the specific embodiments disclosed below.

Figure 1:
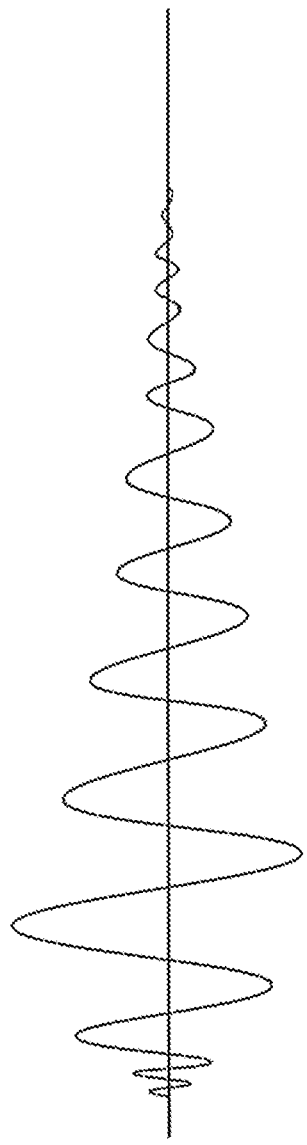
FIG. 1 is a schematic diagram of blasting vibration waves.

The method for reducing blasting vibration of tunneling provided according to some embodiments of the present invention will be described with reference to FIGS. 1 and 2 below.

Some embodiments of the present application provide a method for reducing blasting vibration of tunneling.

Figure 2:
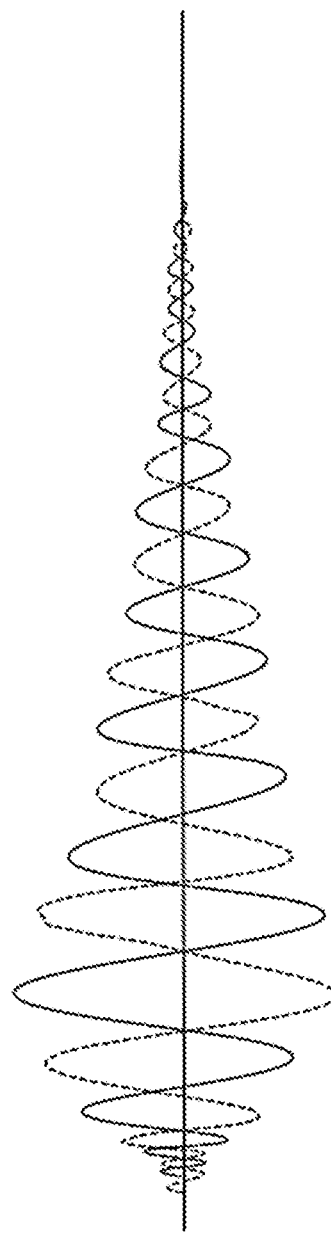
FIG. 2 is a schematic diagram of mutual cancellation out of blasting vibration waves.

As shown in FIG. 2, the first embodiment of the present provides a method for reducing blasting vibration of tunneling, comprising the following steps:
  dividing the cutting holes into several (two) groups or (three) groups according to different cutting methods;
  conducting layout and test blasting on one group of cutting holes before formal tunnel blasting;
  testing blasting parameters for the layout and test blasting, the blasting parameters at least including a period of a vibration wave for the layout and test blasting;
  calculating an interval t, where $t=T/2$, T being the time from the adjacent peak to the trough of the vibration wave;
  conducting layout and test blasting on at least two groups of cutting holes again;
  testing blasting parameters for the layout and test blasting of each group for the second time, and the blasting parameters at least including a period of a vibration wave for the layout and test blasting;
  calculating an interval t, where $t=T/2$, T being the period from the adjacent peak to the trough of the vibration wave in the second layout and test blasting;
  taking the minimum interval t of each group as the interval for formal blasting of the remaining groups of cutting holes, and conducting formal blasting.

The second embodiment of the present provides a method for reducing blasting vibration of tunneling, comprising the following steps:
  dividing the cutting holes into several (two) groups or (three) groups according to different cutting methods;
  conducting layout and test blasting on one group of cutting holes before formal tunnel blasting;
  testing blasting parameters for the layout and test blasting, the blasting parameters at least including a period of a vibration wave for the layout and test blasting;
  calculating an interval t, where $t=T/2$, T being the time from the adjacent peak to the trough of the vibration wave;
  conducting layout and test blasting on at least two groups of cutting holes again;
  testing blasting parameters for the layout and test blasting of each group for the second time, and the blasting parameters at least including a period of a vibration wave for the layout and test blasting;
  calculating an interval t, where $t=T/2$, T being the period from the adjacent peak to the trough of the vibration wave in the second layout and test blasting;
  taking the minimum interval t of each group as the interval for formal blasting of the remaining groups of cutting holes, and conducting formal blasting.

In this embodiment, other blast holes are subject to inter-row group millisecond blasting or single hole millisecond blasting.

In this embodiment, the interval of other blast holes is the maximum interval t of each group In this embodiment, the blasting parameters at least include: frequency, speed and complete oscillogram of the vibration wave.

The third embodiment of the present provides a method for reducing blasting vibration of tunneling, and based on any of the above embodiments, comprises the following steps:
  dividing the cutting holes into several (two) groups or (three) groups according to different cutting methods;
  conducting layout and test blasting on one group of cutting holes before formal tunnel blasting;
  testing blasting parameters for the layout and test blasting, the blasting parameters at least including a period of a vibration wave for the layout and test blasting;
  calculating an interval t, where $t=T/2$, T being the time from the adjacent peak to the trough of the vibration wave;
  conducting layout and test blasting on at least two groups of cutting holes again;
  testing blasting parameters for the layout and test blasting of each group for the second time, and the blasting parameters at least including a period of a vibration wave for the layout and test blasting;
  calculating an interval t, where $t=T/2$, T being the period from the adjacent peak to the trough of the vibration wave in the second layout and test blasting;
  taking the minimum interval t of each group as the interval for formal blasting of the remaining groups of cutting holes, and conducting formal blasting.

In this embodiment, the recommended interval is $t=5$ ms when the rock mass hardness is small.

In this embodiment, the rock mass is at least shale, mudstone and sandstone

The fourth embodiment of the present provides a method for reducing blasting vibration of tunneling, comprising the following steps:
  dividing the cutting holes into several (two) groups or (three) groups according to different cutting methods;
  conducting layout and test blasting on one group of cutting holes before formal tunnel blasting;
  testing blasting parameters for the layout and test blasting, the blasting parameters at least including a period of a vibration wave for the layout and test blasting;
  calculating an interval t, where $t=T/2$, T being the time from the adjacent peak to the trough of the vibration wave;
  conducting layout and test blasting on at least two groups of cutting holes again;
  testing blasting parameters for the layout and test blasting of each group for the second time, and the blasting parameters at least including a period of a vibration wave for the layout and test blasting;

calculating an interval t, where t=T/2, T being the period from the adjacent peak to the trough of the vibration wave in the second layout and test blasting;

taking the minimum interval t of each group as the interval for formal blasting of the remaining groups of cutting holes, and conducting formal blasting.

In this embodiment, the recommended interval is t=3 ms when the rock mass hardness is big.

In this embodiment, the rock mass is at least gabbro and limestone.

The fifth embodiment of the present provides a method for reducing blasting vibration of tunneling, comprising the following steps:

dividing the cutting holes into several (two) groups or (three) groups according to different cutting methods;

conducting layout and test blasting on one group of cutting holes before formal tunnel blasting;

testing blasting parameters for the layout and test blasting, the blasting parameters at least including a period of a vibration wave for the layout and test blasting;

calculating an interval t, where t=T/2, T being the time from the adjacent peak to the trough of the vibration wave;

conducting layout and test blasting on at least two groups of cutting holes again;

testing blasting parameters for the layout and test blasting of each group for the second time, and the blasting parameters at least including a period of a vibration wave for the layout and test blasting;

calculating an interval t, where t=T/2, T being the period from the adjacent peak to the trough of the vibration wave in the second layout and test blasting;

taking the minimum interval t of each group as the interval for formal blasting of the remaining groups of cutting holes, and conducting formal blasting.

In this embodiment, other blast holes are subject to inter-row group millisecond blasting or single hole millisecond blasting.

In this embodiment, the interval of other blast holes is the maximum interval t of each group In this embodiment, the blasting parameters at least include:

frequency, speed and complete oscillogram of the vibration wave.

In this embodiment, the recommended interval is t=5 ms when the rock mass hardness is small.

In this embodiment, the rock mass is at least shale, mudstone and sandstone

In this embodiment, the recommended interval is t=3 ms when the rock mass hardness is big.

In this embodiment, the rock mass is at least gabbro and limestone.

The use of the characteristics of the wave is used in the method for reducing blasting vibration of tunneling proposed by this embodiment, to ensure that the interval t of two sections of blast holes is T/2, thereby superposing the peaks and troughs of the vibration wave, and further canceling out mutually.

The method for reducing blasting vibration of tunneling proposed by this embodiment is equivalent to reducing the peaks of the blasting vibration and filling the troughs of the blasting vibration, so as to balance vibration and reduce the damage to the surrounding buildings.

For the control of blasting vibration, the method for reducing blasting vibration of tunneling proposed by this embodiment promotes the reliability and operability, so as to improve the quality and efficiency of blasting.

The method for reducing blasting vibration of tunneling proposed by this embodiment can reduce the workload of blasting process, improve the construction speed, and save labor, materials, energy consumption and costs.

In the Description, the illustrative expressions of the above terms do not necessarily refer to the same embodiment or example. Moreover, the specific features, structures, materials or characteristics described may be appropriately combined in any one or more embodiments or examples.

Any modification, equivalent replacement and improvement made within the spirit and rule of the present invention shall be incorporated in the protection scope of the present invention.

The invention claimed is:

1. A method for reducing blasting vibration of tunneling, comprising:

drilling a plurality of groups of cut holes on a wall of a tunnel;

carrying out a first test blasting on a first group of cut holes;

carrying out the first test blasting according to a first set of parameters comprising a period of a vibration wave of the first test blasting;

calculating a first interval that equals one half of the time period from a peak to an adjacent trough in the vibration wave;

carrying out a second test blasting on a second group of cut holes;

carrying out the second test blasting according to a second set of parameters comprising a period of a vibration wave of the second test blasting;

calculating a second interval that equals one half of the time period from a peak to an adjacent trough in the vibration wave in the second test blasting; and comparing a value of the first interval and a value of the second interval and assigning the value of the smaller interval as an interval for a formal blasting;

blasting a remainder of the plurality of groups of cut holes according to the interval for the formal blasting; and blasting additional blast holes in the tunnel according to inter-row group millisecond blasting or single hole millisecond blasting according to an interval having a value that is the larger of the first interval and the second interval.

2. The method for reducing blasting vibration of tunneling according to claim 1, wherein each of the first set and the second set of blasting parameters further comprise a frequency, a speed, and a complete oscillogram of the vibration wave.

3. The method for reducing blasting vibration of tunneling according to claim 1, wherein the tunnel has a rock mass that is shale, mudstone, or sandstone, and the interval for the formal blasting is 5 ms.

4. The method for reducing blasting vibration of tunneling according to claim 1, wherein the tunnel has a rock mass that is gabbro or limestone, and an interval for the formal blasting is 3 ms.

* * * * *